Patented June 11, 1935

2,004,115

UNITED STATES PATENT OFFICE 2,004,115

LEVULINIC ACID ESTERS AND THEIR PREPARATION

Emmette F. Izard, Elsmere, and Paul L. Salzberg, Wilmington, Del., assignors to E. I. du Pont de Nemours & Company, Wilmington, Del., a corporation of Delaware No Drawing. Application May 7, 1932, Serial No. 609,975

12 Claims. (Cl. 260—106)

This invention relates to levulinic esters of modified polyhydric alcohols and their preparation.

Heretofore a few isolated levulinic esters of the lower aliphatic alcohols were known but had not been of any practical use.

An object of the present invention is the preparation of levulinic esters of modified polyhydric alcohols and the provision of new plasticizers for cellulose derivatives having great compatibility with the cellulose derivatives, together with low vapor pressures, and extreme water insolubility. Other objects will be apparent from the description given hereinafter.

The above objects are accomplished according to the present invention by reacting levulinic acid with a modified polyhydric alcohol to form the corresponding levulinic ester, isolating the ester.

The reaction of the levulinic acid with the modified polyhydric alcohol may be carried out at a temperature sufficiently high enough so that the water formed in the reaction is removed substantially as fast as it is formed, and/or by employing a catalyst, and/or a solvent such as benzene or toluene to aid in the removal of the water. An inert gas such as carbon dioxide may also be passed through the reaction mixture to aid in removal of the water. It is preferred to keep the temperature between 80°–250° C., depending to some extent on the boiling point of the alcohol being used. As suitable catalysts may be mentioned hydrochloric acid, sulphuric acid, aryl-sulphonic acids, such as p-toluene-sulphonic acid, alcoholates such as sodium alcoholate, and zinc chloride.

The following examples are given to illustrate the preparation of esters according to the present invention:

Example 1. *Ethoxyethyl levulinate.*—A mixture of 29 grams of levulinic acid, 25 grams of ethoxyethanol, 100 cc. of benzene and 2 drops of concentrated sulphuric acid was heated to boiling in an apparatus designed to separate the water from the distillate and return the benzene to the reaction flask until the theoretical amount of water had been removed. The product was then washed with sodium carbonate to remove excess acid, dried over sodium sulphate and vacuum distilled. The ethoxyethyl levulinate thus produced distilled at 108° C. at 5 mm. pressure.

Example 2. *Butoxyethyl levulinate.*—A mixture of 23.2 grams of levulinic acid, 23.6 grams of butoxyethanol, and 2 drops of concentrated hydrochloric acid was heated at 150–160° C. for 12 hours under an air condenser which allowed water vapor to escape but which condensed the other vapors. The product was then vacuum distilled, the butoxyethyl levulinate distilling at 150–175° C. at 11 mm. pressure.

Example 3. *Coconut oil diglyceride levulinate.*—A mixture containing 23.2 grams of levulinic acid and 96 grams of the diglyceride of coconut oil was heated at 190–200° C. for 12 hours, followed by four hours additional heating while carbon dioxide was passed rapidly into the mixture. With this treatment the acid number was decreased to about 12 and without further purification the coconut oil diglyceride levulinate was ready for use as a plasticizer in cellulose derivative compositions.

Example 4. *Coconut oil monoglyceride dilevulinate.*—A mixture containing 46.4 grams of levulinic acid and 57.2 grams of the monoglyceride of coconut oil was heated at 190–200° C. for 12 hours, followed by four hours further heating while carbon dioxide was passed rapidly into the mixture. By this treatment the acid number was lowered to about 21 and the resulting coconut oil monoglyceride dilevulinate without further purification was ready for use as a plasticizer in cellulose derivative compositions.

Example 5. *Hydrogenated castor oil trilevulinate.*—A mixture containing 34 grams of levulinic acid and 108 grams of hydrogenated castor oil was heated at 190–200° C. for 12 hours, followed by four hours further heating while carbon dioxide was passed rapidly into the mixture. By this treatment the acid number of the mixture was lowered to 15 and hydrogenated castor oil trilevulinate was obtained suitable for use without further purification.

Example 6. *Lauroxyethyl levulinate.*—A mixture of 29 grams of lauroxyethanol and 14.6 grams of levulinic acid was heated at 170–180° C. for 8 hours under an air condenser which allowed water vapor to escape but condensed the other vapors. The product was then vacuum distilled, the lauroxyethyl levulinate distilling between 170–190° C. at 1.5 mm. pressure.

Example 7. *Phenoxyethyl levulinate.*—A mixture of 29 grams of levulinic acid, 38 grams of phenoxyethanol, 120 cc. of toluene, and 2 drops of concentrated sulphuric acid was heated to boiling in an apparatus designed to separate the water from the distillate and return the toluene to the reaction flask. The theoretical amount of water was removed in 2–3 hours. The resulting product was washed with sodium carbonate to remove excess acid and then vacuum distilled, phenoxyethyl levulinate distilling between 165–166° C. at 2 mm. pressure.

*Example 8. Ethoxyethoxyethyl levulinate.*—A mixture containing 34.8 grams levulinic acid, 40.2 grams of ethoxyethoxyethanol, and 4 drops of concentrated hydrochloric acid was heated at 150–170° C. for 10 hours under an air condenser. The product was then vacuum distilled, ethoxyethoxyethyl levulinate distilling between 139–140° C. at 2 mm. pressure.

*Example 9. Butoxyethoxyethyl levulinate.*—A mixture of 23.2 grams of levulinic acid, 32.4 grams of butoxyethoxyethanol, and 2 drops of concentrated hydrochloric acid was heated at 160–170° C. for 12 hours under an air condenser. The product was then vacuum distilled, the butoxyethoxyethyl levulinate distilling between 175–195° C. at 10 mm. pressure.

The above examples merely illustrate specific methods of preparing specific esters of the general class of esters coming within the scope of this invention. The proportion of levulinic acid to modified polyhydric alcohol may, of course, be varied widely, although it is preferred to employ an excess of the levulinic acid above stoichiometric proportions.

By the term "modified polyhydric alcohol" as used herein is meant a compound consisting of a polyhydric alcohol in which the hydrogen of at least one hydroxyl group is replaced by an organic radical, said compound containing at least one free hydroxyl group. Polyhydroxy carbonyl compounds such as the sugars are not included within the meaning of the term "polyhydric alcohol". In general the sugars and the carbohydrates do not esterify readily with levulinic acid. Other modified polyhydric alcohols than those disclosed in the specific examples suitable for use in the process according to the present invention include:—tetrahydrofurfuryl alcohol, tetrahydrofurfuryloxyethanol, dimethylin, dibutylin, cyclohexyloxyethanol, ethoxycyclohexyl alcohol, stearoxyethanol, glycol monoacetate, monoethylin, monobenzylin, glycerine chlorhydrin, monoacetin, linseed oil monoglyceride, coconut oil monoglyceride, China wood oil monoglyceride, linseed oil glycolide, China wood oil diglyceride, di-, tri-, and tetraethyl sorbitol, sorbitol triacetate, benzyl sorbitol, castor oil, glycol dilactate, diethylene glycol, glycol monolaurate, methoxy propyl and benzyloxyethyl alcohols.

All of these esters are substantially water white liquids when pure, or in a few instances, colorless solids. They are, in general, immiscible or insoluble in water and are readily soluble in the ordinary solvents, such as alcohols, ketones, and esters. They have extremely low vapor pressures and are compatible in equal proportions with cellulose nitrate, and in equal or lower proportions with other cellulose esters and ethers, such as cellulose acetate, crotyl cellulose, benzyl cellulose, ethyl cellulose, cellulose propionate, and the like. The levulinic esters of ether alcohols are particularly conspicuous for use with cellulose acetate, since the ketone group of the levulinic acid enhances the solubilizing action on this cellulose derivative and these particular esters are compatible in high amounts. However, it will be seen from the discussion of the properties of this class of esters that they are all highly suitable for use as plasticizers in all types of cellulose derivative compositions, cellulose derivative compositoins containing the esters as plasticizers giving films which are tough and flexible and retain their flexibility substantially indefinitely due to the low vapor pressures of the esters. Due to the water insolubility of the esters, the water resistance of the films is also improved.

Coating compositions containing cellulose derivatives and plasticizers of the present invention give tough, flexible films of good water resistance. Resins, such as Damar, ester gum, polyhydric alcohol-polybasic acid, synthetic resins, etc., pigments, fillers, and other plasticizers, such as those already known to the art, including triacetin, dimethyl phthalate, acetanalide, and triphenyl phosphate, camphor, dibutyl phthalate, and tricresyl phosphate, may be used together with solvents, for example acetone for cellulose acetate compositions, ethyl alcohol for cellulose nitrate compositions, and toluol-alcohol mixtures for cellulose ether compositions.

The esters of the present invention may be used in the preparation of all types of cellulose derivative compositions; in particular they may be used in the preparation of lacquers for coating metal and wood, dopes for coating fabrics, and the like, and in plastic compositions to be used in the preparation of toilet ware, novelties, sheeting, rods, tubes, et cetera. These esters are also extremely valuable for use as plasticizers in blasting powders, and the like.

Among the advantages of the present invention are that it furnishes water resistant plasticizers for cellulose derivatives. Another advantage, particularly of the levulinic esters of the ether alcohols, is that they are much more compatible with cellulose acetate than ordinary plasticizers and, due to their low vapor pressure, they give products which are substantially permanently flexible and have excellent durability.

As many apparently widely different embodiments of this invention may be made without departing from the spirit and scope thereof, it is to be understood that the invention is not limited to the specific embodiments thereof except as defined in the appended claims.

We claim:

1. Process comprising heating levulinic acid and a modified polyhydric alcohol to reaction temperature, and removing by vaporization the water formed by said reaction from the reaction zone at substantially the rate it is formed, said modified polyhydric alcohol containing at least one free hydroxyl group and consisting of a polyhydric alcohol of which the hydrogen atom of at least one hydroxyl group has been replaced by an organic radical.

2. Process comprising reacting levulinic acid and a modified polyhydric alcohol at 80°–250° C., and removing by vaporization the water formed by said reaction from the reaction zone at substantially the rate it is formed, said modified polyhydric alcohol containing at least one free hydroxyl group and consisting of a polyhydric alcohol of which the hydrogen atom of at least one hydroxyl group has been replaced by an organic radical.

3. Process comprising reacting levulinic acid and a modified polyhydric alcohol at 80°–250° C. in the presence of a catalyst, and removing by vaporization the water formed by said reaction from the reaction zone at substantially the rate it is formed, said modified polyhydric alcohol containing at least one free hydroxyl group and consisting of a polyhydric alcohol of which the hydrogen atom of at least one hydroxyl group has been replaced by an organic radical.

4. Process comprising reacting levulinic acid and a modified polyhydric alcohol at 80°–250° C. in the presence of a relatively volatile solvent for the reaction mixture, and removing by vaporization the water formed by said reaction from the reaction zone at substantially the rate it is formed, said modified polyhydric alcohol containing at least one free hydroxyl group and consisting of a polyhydric alcohol of which the hydrogen atom of at least one hydroxyl group has been replaced by an organic radical.

5. Process comprising reacting levulinic acid and a modified polyhydric alcohol at 80°–250° C., and removing the water formed by said reaction from the reaction zone by passing an inert gas through the reaction mixture, said modified polyhydric alcohol containing at least one free hydroxyl group and consisting of a polyhydric alcohol of which the hydrogen atom of at least one hydroxyl group has been replaced by an organic radical.

6. A levulinic ester of a modified polyhydric alcohol, said modified polyhydric alcohol containing at least one free hydroxyl group and consisting of a polyhydric alcohol of which the hydrogen atom of at least one hydroxyl group has been replaced by an organic radical.

7. A levulinic ester of an ether alcohol.
8. A levulinic ester of an ether ethanol.
9. A levulinic ester of an alkoxyethanol.
10. Butoxyethyl levulinate.
11. Butoxyethoxyethyl levulinate.
12. Lauroxyethyl levulinate.

EMMETTE F. IZARD.
PAUL L. SALZBERG.